US011473441B2

(12) United States Patent
van der Merwe et al.

(10) Patent No.: US 11,473,441 B2
(45) Date of Patent: Oct. 18, 2022

(54) EMBEDDED ELECTRIC MACHINE

(71) Applicant: General Electric Company, Schenectady, NY (US)

(72) Inventors: Gert Johannes van der Merwe, Lebanon, OH (US); Daniel Alan Niergarth, Cincinnati, OH (US); Peter David Toot, Mason, OH (US)

(73) Assignee: General Electric Company, Schenectady, NY (US)

( * ) Notice: Subject to any disclaimer, the term of this patent is extended or adjusted under 35 U.S.C. 154(b) by 1244 days.

(21) Appl. No.: 15/278,482

(22) Filed: Sep. 28, 2016

(65) Prior Publication Data
US 2018/0087396 A1 Mar. 29, 2018

(51) Int. Cl.
*F01D 15/10* (2006.01)
*F04D 19/02* (2006.01)
(Continued)

(52) U.S. Cl.
CPC .............. *F01D 15/10* (2013.01); *F01D 5/06* (2013.01); *F01D 15/12* (2013.01); *F01D 25/16* (2013.01); *F01D 25/28* (2013.01); *F02C 3/113* (2013.01); *F02C 7/36* (2013.01); *F04D 19/02* (2013.01); *F05D 2220/32* (2013.01);
(Continued)

(58) Field of Classification Search
CPC . F01D 15/10; F01D 15/12; F01D 5/06; F01D 25/16; F01D 25/28; F05D 2260/40311; F05D 2220/32; F05D 2260/4023; F04D 19/02; F16H 1/28
See application file for complete search history.

(56) References Cited

U.S. PATENT DOCUMENTS 3,673,802 A 7/1972 Krebs et al.
3,729,957 A 5/1973 Petrie et al.
(Continued)

FOREIGN PATENT DOCUMENTS

EP 1 933 017 A2 6/2008
EP 1933017 A2 6/2008
(Continued)

OTHER PUBLICATIONS

International Search Report and Written Opinion issued in connection with corresponding PCT Application No. PCT/US2017/048413 dated Nov. 20, 2017.
(Continued)

*Primary Examiner* — Topaz L. Elliott
*Assistant Examiner* — Aye S Htay
(74) *Attorney, Agent, or Firm* — Dority & Manning, P.A.

(57) ABSTRACT

A gas turbine engine includes a compressor section and a turbine section. A first spool is rotatable with a first turbine of the turbine section and a first compressor of the compressor section. Additionally, a second spool is rotatable with a second turbine of the turbine section and a second compressor of the compressor section. An electric machine is positioned at least partially inward of the core air flowpath of the gas turbine engine along a radial direction of the gas turbine engine. Additionally, the exemplary gas turbine engine includes a gear assembly mechanically coupled to both the first spool and the second spool, such that the first and second spools may each drive the electric machine.

20 Claims, 6 Drawing Sheets

(51) Int. Cl.
  *F01D 5/06* (2006.01)
  *F01D 15/12* (2006.01)
  *F01D 25/16* (2006.01)
  *F01D 25/28* (2006.01)
  *F02C 3/113* (2006.01)
  *F02C 7/36* (2006.01)
  *F16H 1/28* (2006.01)
  *F16D 41/069* (2006.01)

(52) U.S. Cl.
  CPC .............. *F05D 2260/4023* (2013.01); *F05D 2260/40311* (2013.01); *F16D 41/069* (2013.01); *F16H 1/28* (2013.01); *Y02T 50/60* (2013.01)

(56) References Cited

U.S. PATENT DOCUMENTS

| | | | |
|---|---|---|---|
| 4,751,816 A | 6/1988 | Perry | |
| 4,936,748 A | 6/1990 | Adamson et al. | |
| 7,818,970 B2* | 10/2010 | Price | F01D 15/10 60/39.281 |
| 8,302,405 B2* | 11/2012 | Price | F01D 17/162 60/772 |
| 8,314,505 B2* | 11/2012 | McLoughlin | F01D 15/10 290/40 C |
| 2006/0254253 A1 | 11/2006 | Herlihy et al. | |
| 2008/0138195 A1* | 6/2008 | Kern | F02C 3/113 415/122.1 |
| 2008/0143115 A1* | 6/2008 | Kern | F02K 3/06 290/52 |
| 2010/0105516 A1* | 4/2010 | Sheridan | F01D 25/18 475/346 |
| 2013/0014513 A1* | 1/2013 | Barnett | F02C 7/32 60/802 |
| 2014/0000278 A1* | 1/2014 | Winter | F02C 7/185 60/785 |
| 2015/0377142 A1* | 12/2015 | Sheridan | F02C 3/107 60/778 |
| 2016/0177770 A1* | 6/2016 | Adams | F01D 15/10 290/46 |
| 2017/0126159 A1* | 5/2017 | Spierling | H02K 7/1823 |
| 2017/0175874 A1* | 6/2017 | Schwarz | F01D 25/20 |
| 2017/0292523 A1* | 10/2017 | Niergarth | B64D 27/24 |
| 2017/0297727 A1* | 10/2017 | Niergarth | B64D 27/24 |
| 2017/0297728 A1* | 10/2017 | Niergarth | B64D 27/02 |
| 2019/0085715 A1* | 3/2019 | van der Merwe | H02K 7/1823 |

FOREIGN PATENT DOCUMENTS

| | | |
|---|---|---|
| GB | 2 197 392 A | 5/1988 |
| GB | 2197392 A | 5/1988 |

OTHER PUBLICATIONS

International Preliminary Report on Patentability Corresponding to PCT/US2017/048413 dated Apr. 4, 2019.

Machine Translated Chinese Office Action and Search Report Corresponding to Application No. 201780072919 dated Nov. 19, 2020.

Huang Guoziong, "Equipment Installation Basis", University of Electronic Science and Technology Press, Jun. 30, 2014, pp. 214-215.

Wu Xinyue et al., "Machinery Foundation", National Defense Industry Press, Jun. 30, 2016, pp. 80-87.

* cited by examiner

EMBEDDED ELECTRIC MACHINE

FIELD OF THE INVENTION

The present subject matter relates generally to a gas turbine engine having an embedded electric machine.

BACKGROUND OF THE INVENTION

Typical aircraft propulsion systems include one or more gas turbine engines. For certain propulsion systems, the gas turbine engines generally include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Additionally, certain gas turbine engines are coupled to an electric machine, such as an electric generator, such that the gas turbine engine may drive the electric machine during operation to provide electric power to the aircraft or other components of the propulsion system. For at least certain applications, the electric generator may need to generate a baseline amount of electric power regardless of whether the gas turbine engine is operating under idle conditions, cruise conditions, or maximum power conditions. In order to provide such baseline electric power across such a wide array of engine speeds, it is sometimes necessary to over-size, or over-engineer, the electric machine.

However, such may lead to a relatively heavy electric machine generating more power than necessary during at least certain engine conditions. Accordingly, a gas turbine engine and electric machine capable of generating a baseline amount of electric power across a wide array of engine speeds without being unnecessarily oversized would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine defining a radial direction and an axial direction is provided. The gas turbine engine includes a compressor section including a first compressor and a second compressor, and a turbine section including a first turbine and a second turbine. The compressor section and the turbine section together define at least in part a core air flowpath. The gas turbine engine also includes a first spool rotatable with the first turbine and the first compressor, and a second spool rotatable with the second turbine and the second compressor. The gas turbine engine also includes an electric machine positioned at least partially inward of the core air flowpath along the radial direction, and a gear assembly mechanically coupling the first spool and second spool to the electric machine for driving the electric machine.

In another exemplary embodiment of the present disclosure, a gas turbine engine defining a radial direction is provided. The gas turbine engine includes a turbine section including a first turbine and a second turbine, the turbine section defining at least in part a core air flowpath. The gas turbine engine also includes a first spool rotatable with the first turbine, a second spool rotatable with the second turbine, and an electric machine positioned at least partially inward of the core air flowpath along the radial direction. The gas turbine engine also includes an epicyclic gear assembly coupled to the first spool, the second spool, and the electric machine such that both the first spool and second spool are configured for driving the electric machine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
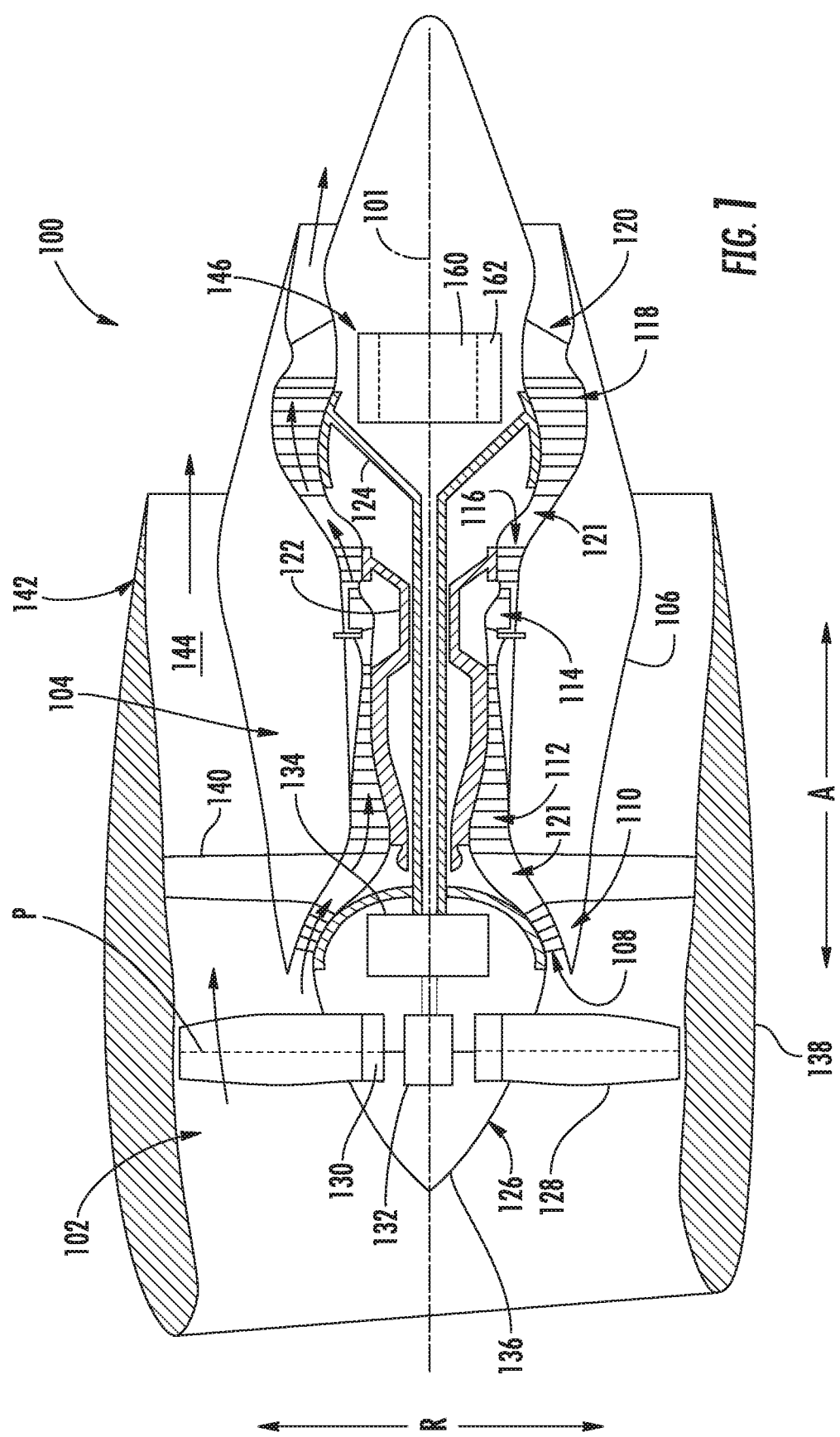
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The present application is directed generally towards a gas turbine engine including a compressor section and a turbine section. A first spool is rotatable with a first turbine of the turbine section and a first compressor of the compressor section. Additionally, a second spool is rotatable with a second turbine of the turbine section and a second compressor of the compressor section. The exemplary gas turbine engine further includes an electric machine positioned at least partially inward of the core air flowpath of the gas turbine engine along a radial direction of the gas turbine engine. The electric machine may, in at least certain embodiments, be configured as an electric generator for providing electric power to, e.g., an aircraft with which the gas turbine engine is installed. Additionally, or alternatively, the electric machine may be configured for providing electric power to one or more electric propulsion devices of a propulsion system of the aircraft with which the gas turbine engine is installed.

Further, the electric machine is coupled to both the first spool and the second spool of the gas turbine engine through a gear assembly, such that both the first and second spools may drive the electric machine. As will be explained in greater detail below, such a configuration may allow for a reduction in a turndown ratio of the electric machine, which may in turn allow for a reduction in a size and weight of the electric machine.

Referring now to the drawings, wherein identical numerals indicate the same elements throughout the figures, FIG. 1 provides a schematic cross-sectional view of a propulsion engine in accordance with an exemplary embodiment of the present disclosure. In certain exemplary embodiments, the propulsion engine may be configured a high-bypass turbofan jet engine 100, herein referred to as "turbofan 100." As shown in FIG. 1, the turbofan 100 defines an axial direction A (extending parallel to a longitudinal centerline 101 provided for reference), a radial direction R, and a circumferential direction C (extending about the axial direction A; see FIG. 3). In general, the turbofan 100 includes a fan section 102 and a core turbine engine 104 disposed downstream from the fan section 102.

The exemplary core turbine engine 104 depicted generally includes a substantially tubular outer casing 106 that defines an annular inlet 108. The outer casing 106 encases, in serial flow relationship, a compressor section including a second, booster or low pressure (LP) compressor 110 and a first, high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define a core air flowpath 121 extending from the annular inlet 108 through the LP compressor 110, HP compressor 112, combustion section 114, HP turbine section 116, LP turbine section 118 and jet nozzle exhaust section 120. A first, high pressure (HP) shaft or spool 122 drivingly connects the HP turbine 116 to the HP compressor 112. A second, low pressure (LP) shaft or spool 124 drivingly connects the LP turbine 118 to the LP compressor 110.

For the embodiment depicted, the fan section 102 includes a variable pitch fan 126 having a plurality of fan blades 128 coupled to a disk 130 in a spaced apart manner. As depicted, the fan blades 128 extend outwardly from disk 130 generally along the radial direction R. Each fan blade 128 is rotatable relative to the disk 130 about a pitch axis P by virtue of the fan blades 128 being operatively coupled to a suitable actuation member 132 configured to collectively vary the pitch of the fan blades 128 in unison. The fan blades 128, disk 130, and actuation member 132 are together rotatable about the longitudinal axis 12 by LP shaft 124 across a power gear box 134. The power gear box 134 includes a plurality of gears for stepping down the rotational speed of the LP shaft 124 to a more efficient rotational fan speed.

Referring still to the exemplary embodiment of FIG. 1, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the core turbine engine 104. The nacelle 138 is mechanically coupled to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween.

Additionally, the exemplary turbofan 100 depicted includes an electric machine 146. Specifically, for the embodiment depicted, the electric machine 146 is configured as an electric generator co-axially positioned with the LP shaft 124 and the HP shaft 122. As used herein, "co-axially" refers to the axes being aligned. Although not depicted, but as will be described in detail below, the electric machine 146 is mechanically coupled to the HP spool 122 and the LP spool 124 through a gear assembly.

It should be appreciated, however, that the exemplary turbofan engine 100 depicted in FIG. 1 is provided by way of example only, and that in other exemplary embodiments, the turbofan engine 100 may have any other suitable configuration. For example, in other exemplary embodiments, the turbofan engine 100 may instead be configured as a turboprop engine, a turbojet engine, a differently configured geared turbofan engine or direct drive turbofan engine, or any other suitable gas turbine engine.

Figure 2:
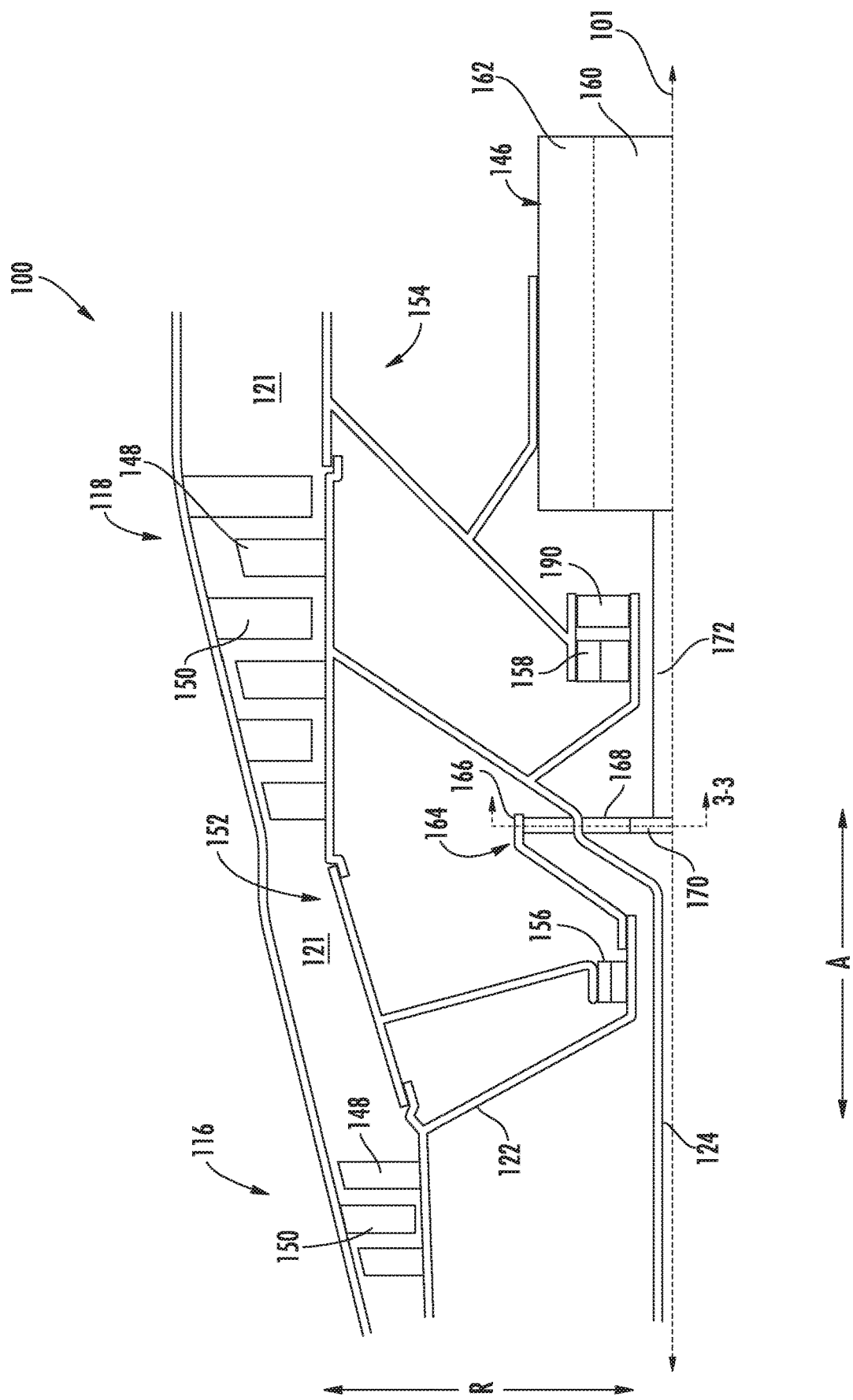
FIG. 2 is a schematic, cross-sectional view of a turbine section of a gas turbine engine in accordance with an exemplary embodiment of the present disclosure.

Referring now to FIG. 2, a close-up, schematic view of a turbine section of the gas turbine engine in accordance with an exemplary embodiment of the present disclosure is depicted. More specifically, FIG. 2 depicts schematically the exemplary electric machine 146 of the exemplary turbofan engine 100 of FIG. 1.

As discussed above, the turbine section generally includes the HP turbine 116 and the LP turbine 118. The HP turbine 116 includes a plurality of rotor blades 148 rotatable with the HP spool 122, as well as a plurality of fixed stator vanes 150. Similarly, the LP turbine 118 includes a plurality of turbine rotor blades 148 rotatable with the LP spool 124 and a plurality of fixed stator vanes 150. Moreover, the gas turbine engine includes a turbine center frame 152 and a turbine rear frame 154, each providing support for the various rotating components of the gas turbine engine. Specifically, the HP spool 122 is supported by the turbine center frame 152 through a first bearing 156, and similarly, the LP spool 124 is supported by the turbine rear frame 154 through a second bearing 158. The first and second bearings 156, 158 are depicted schematically as roller bearings, however in other embodiments, the first and/or second bearings 156, 158 may instead be configured as any other suitable bearing, or suitable plurality of bearings, positioned at any suitable location.

As is depicted, for the embodiment of FIG. 2 the electric machine 146 is embedded within the turbine section of the gas turbine engine, and more particularly still, is coaxially positioned with the HP spool 122 and the LP spool 124 (i.e., defines an axis of rotation in alignment with the axial centerline 101). The electric machine 146 generally includes a rotor 160 and a stator 162. The stator 162 is, for the embodiment depicted, supported through the turbine rear frame 154. It should be appreciated that although for the embodiment depicted the electric machine 146 is configured as an in-runner electric machine, in other embodiments, the electric machine 146 may instead be configured as an out-runner electric machine (i.e., with the rotor 160 positioned radially outward of the stator 162).

Moreover, for the embodiment depicted, the electric machine 146 is configured as an electric generator, driven by both the HP spool 122 and the LP spool 124 during at least certain operations, as will be discussed in greater detail below. More specifically, for the embodiment depicted, the gas turbine engine additionally includes a gear assembly 164 mechanically coupling the HP spool 122 and the LP spool 124 to the electric machine 146, such that one or both of the HP spool 122 and the LP spool 124 may transfer power to the electric machine, e.g., via a rotor shaft (such as the exemplary rotor shaft 172 described below).

Figure 3:
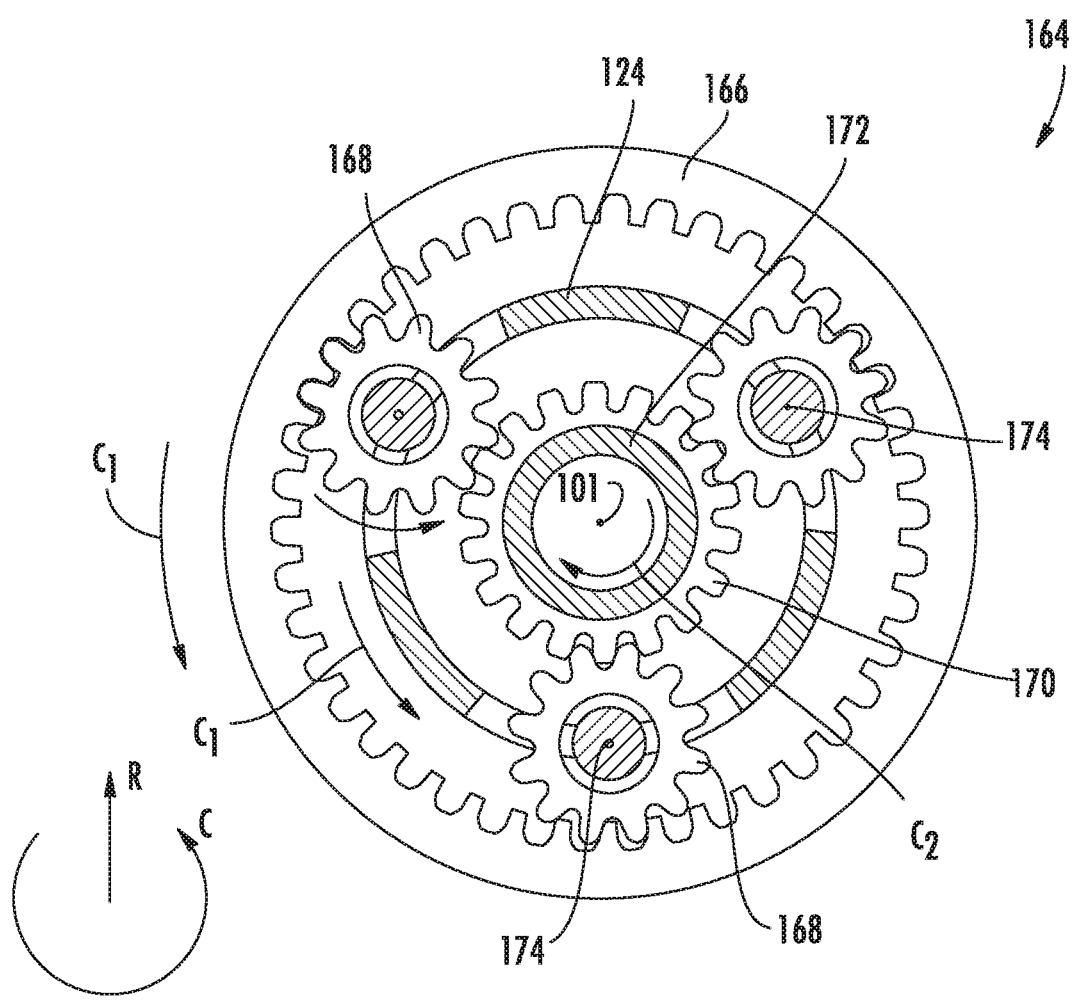
FIG. 3 is a cross-sectional view of a gear assembly in accordance with an exemplary embodiment of the present disclosure, as incorporated in the turbine section of the gas turbine engine of FIG. 2, taken along Line 3-3 of FIG. 2.

Referring now also to FIG. 3, providing a cross-sectional view of the gear assembly 164 of FIG. 2, taken along Line 3-3 in FIG. 2, for the embodiment depicted, the gear assembly 164 is configured as an epicyclic gear assembly, and more specifically still, as a planetary gear assembly 164. Accordingly, the gear assembly 164 includes a ring gear 166, one or more planet gears 168, and a sun gear 170. Specifically, for the embodiment depicted, the ring gear 166 is attached to the first, HP spool 122, the one or more planet gears 168 are each attached to the second, LP spool 124, and the sun gear 170 is attached to the electric machine 146. As is depicted, the exemplary electric machine 146 includes a rotor shaft 172 attached to the rotor 160. The rotor shaft 172 is, in turn, fixedly attached to the sun gear 170, such that rotation the sun gear 170 correspondingly rotates the rotor shaft 172 and rotor 160 of the electric machine 146. Additionally, the one or more planet gears 168 are rotatably attached to the LP spool 124 about respective planet gear axes 174. Notably, for the embodiment depicted the gear assembly 164 includes three planet gears 168. It should be appreciated, however, that in other embodiments, the gear assembly 164 may instead include any other suitable number of planet gears 168, such as two planet gears, four planet gears, etc.

Referring now specifically to FIG. 3, the exemplary gas turbine engine is configured such that the LP spool 124 and HP spool 122 each rotate in the same, first circumferential direction C1 during operation. The first circumferential direction C1 is depicted as a counterclockwise direction for the view of the embodiment depicted. Additionally, it will be appreciated that the HP spool 122 may, during operation, be rotating at a higher rotational speed than the LP spool 124. The differential speed between the HP spool 122 and the LP spool 124 may result in each of the plurality of planet gears 168 rotating about their respective planet gear axes 174, in addition to the planet gears 168 rotating in the first circumferential direction C1 with the LP spool 124. For the view of the embodiment depicted, each of the plurality of planet gears 168 will be rotating in a counterclockwise direction about their respective planet gear axes 174. The above movement of the ring gear 166 and planet gears 168 may, in turn, cause the sun gear 170, which is fixedly attached to the rotor shaft 172, to rotate in a second circumferential direction C2, opposite from the first circumferential direction C1. For example, the above movement may cause the sun gear 170 to rotate in the second circumferential direction C2 for combinations of LP spool 124 and HP spool 122 rotational speeds typical of operating gas turbine engines, including the depicted high-bypass turbofan jet engine 100. It should be appreciated, however, that in other exemplary embodiments, the sun gear 170 may instead rotate in the first circumferential direction C1 during certain or all operating conditions. The rotational direction of the sun gear 170 may depend, for example, on a bypass ratio of the turbofan engine 100, use of the electric machine as a starter/generator as opposed to just as a generator, whether the turbofan is a co-rotating engine or counter-rotating engine (i.e., the LP spool 124 rotates in an opposite direction than the HP spool 122), etc.

Figure 4:
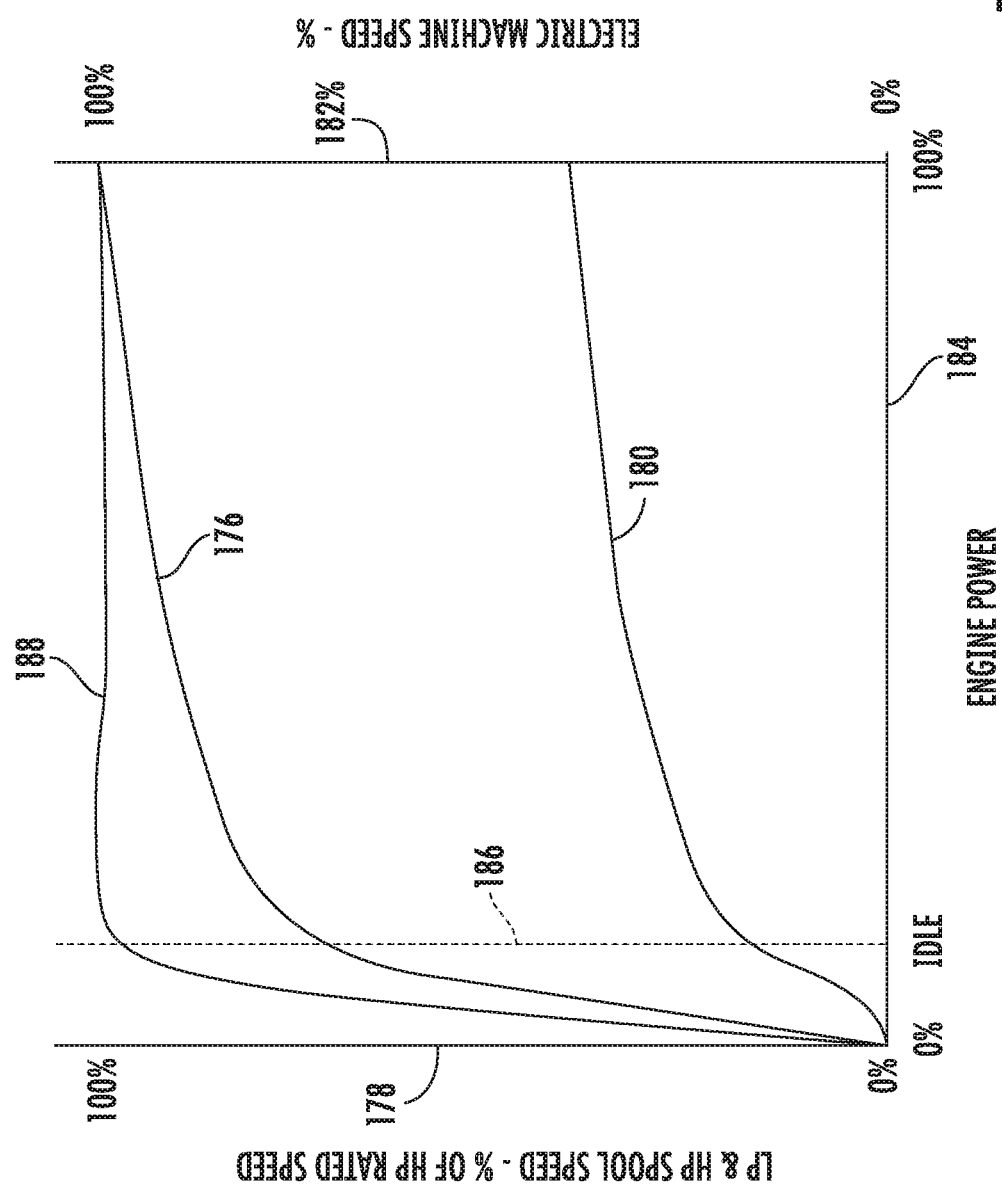
FIG. 4 is a graph depicting spool speeds of a gas turbine engine in accordance with an exemplary embodiment of the present disclosure across various power levels of the exemplary gas turbine engine.

Notably, with such a configuration, torque from both the HP spool 122 and the LP spool 124 may be transferred through the gear assembly 164 and the generator rotor shaft 172 to drive the electric machine 146. Such a configuration may also reduce a turndown ratio for the electric machine 146. The turndown ratio refers to a ratio of maximum speed to minimum speed of the electric machine 146 between idle and rated engine power. Referring now briefly to FIG. 4, a graph is provided depicting an HP spool speed 176 (e.g., a rotational speed of the HP spool 122) normalized to 100% of its rated speed along a first y-axis 178 and an LP spool speed 180 (e.g., a rotational speed of the LP spool 124) normalized to 100% of the HP spool rated speed also along the first y-axis 180. The range of respective LP and HP spool speeds 180, 176 is shown for a range of engine power between 0% and 100% along the x-axis 184. In a typical example shown, both LP spool speed 180 and HP spool speed 176 reach their rated (maximum) values at the 100% engine power and for illustration, rated physical LP spool speed 180 is assumed to be about 40% the RPM (i.e., speed in revolutions per minute) of the physically rated HP spool speed 176 (e.g., the scales of speed curves 180 and 176 are the same in terms of RPM, expressed in % rated HP spool speed 176). The general function of the electric machine 146 speeds described herein do not depend upon the LP and HP rated speeds being reached together or at rated engine power, and applies to a wide range of possible ratios of rated LP spool speed to rated HP spool speed, within which 40% is included. FIG. 4 shows two regions divided by the phantom line 186 which represents idle. To the left is the startup region and to the right is the operating region. As is depicted, the speed 176 of the HP spool 122 is increased more quickly than the speed 180 of the LP spool 124 during a startup of the engine. At idle, the speed 176 of the HP spool 122 is much higher than the speed 180 of the LP spool 124 as a percent of the maximum HP spool speed 176 and in RPM. Logically then, as the engine power increases from idle to maximum power, the LP spool speed 180 is increased much faster and may reach or exceed the same rate of change of RPM as the HP spool speed 176 in the operating range. The inventors of the present disclosure have therefore discovered that driving an electric machine 146 using a gear assembly 164 in accordance with an exemplary embodiment of the present disclosure may allow for the HP spool 122 to contribute the most speed to the rotor shaft 172 of the electric machine 146 when, such as during startup and near-idle conditions, the LP spool 124 is rotating relatively slowly. By contrast, once the LP spool 124 speeds up, the LP spool 124 decreases the speed of the electric machine 146 relative to what otherwise would occur without the effects of the gear assembly 164.

An exemplary electric machine rotational speed line 188 is also depicted in FIG. 4 along a second y-axis 182 normalized to 100% rated speed of the electric machine 146. As is indicated by the electric machine rotational speed line 188, inclusion of a gear assembly 164 in accordance with an exemplary embodiment of the present disclosure may allow for an effective turndown ratio for the electric machine 146 to be less than about 1.4:1. For example, in certain embodiments, the effective turndown ratio of the electric machine 146 may be less than about 1.3:1, such as less than about 1.1:1.

It should be appreciated, that inclusion of a gear assembly for driving an electric machine capable of reducing an effective turndown ratio of the electric machine may allow for an overall reduction in size of the electric machine. Specifically, electric machines are typically required to generate a baseline amount of electric power across a wide array of rotational speeds of the engine. For example, in certain embodiments, the electric machine may be required to provide a baseline power (e.g., 1 megawatt) at idle conditions as well as during cruise conditions. By reducing an effective turndown ratio for the electric machine, the electric machine may be designed to operate within a smaller window of rotational input speeds, such that designing the electric machine to create the baseline amount of electrical power at a lower end of the range of input speeds does not result in an electric machine as oversized or over-engineered as may otherwise be necessary. Such may result in a lighter and more cost-efficient electric machine.

Figure 5:
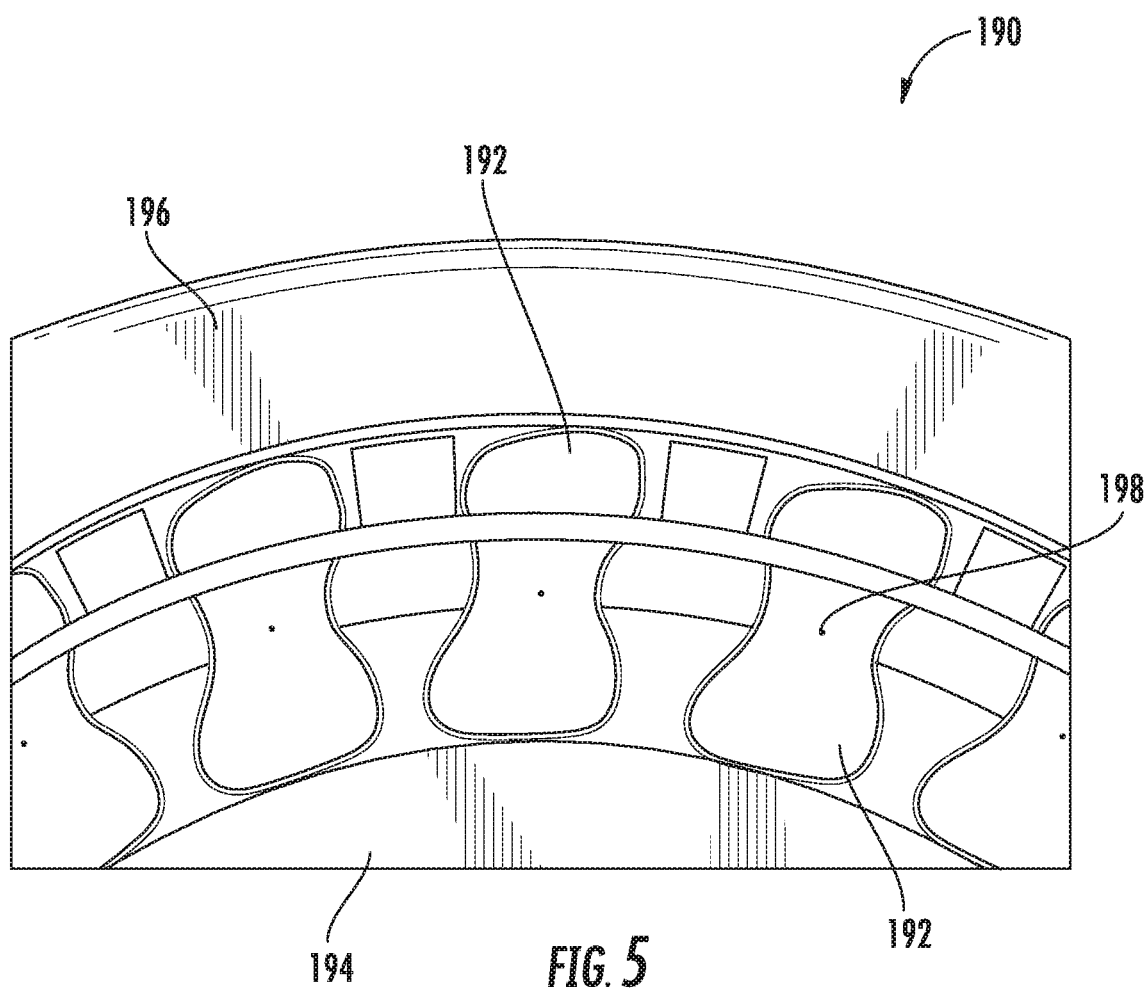
FIG. 5 is a close-up view of a one-way clutch in accordance with an exemplary embodiment of the present disclosure.

Referring again to FIG. 2, it will be appreciated, that during, e.g., startup of the engine, the HP shaft may be rotating with little or no power being delivered to the LP spool 124. If an engine is running, i.e., fuel is being burned and is energizing an HP turbine 116 and LP turbine 118, LP spool rotational speed 180 will be in the first circumferential direction C1. Likewise, if an engine is wind-milling, i.e., no fuel is being burned but air is being forced through an HP turbine 116 and LP turbine 118, LP spool rotational speed 180 will also be in the first circumferential direction C1. However, if an electric machine 146 is being electrically powered to rotate the rotor shaft 172, such as when used as an engine starter, it may urge the LP spool 124 to rotate in the second circumferential direction C2, opposite to the first circumferential direction C1 (see FIG. 3). Thus, the exemplary engine depicted further includes a one-way clutch 190 positioned between the LP spool 124 and a turbine frame, or more particularly, the turbine rear frame 154, for preventing the LP spool 124 from rotating in the second circumferential direction C2, opposite to the first circumferential direction C1. Referring briefly to FIG. 5, the one-way clutch 190 may be configured as a sprag clutch. FIG. 5 depicts schematically a one-way clutch 190 having such a configuration (i.e., as a sprag clutch) as may be incorporated in the exemplary gas turbine engine of FIG. 2. The exemplary sprag clutch depicted includes a plurality of sprags 192 positioned between an inner race 194 and an outer race 196. The outer race 196 may be fixed to the turbine rear frame 154 and the inner race 194 may be fixed to the LP spool 124 (see FIG. 2). When the inner race 194 rotates counterclockwise relative to the outer race 196 (at least for view of the embodiment depicted), the plurality sprags 192 provide substantially no resistance to such movement. By contrast, when the inner race 194 attempts to rotate clockwise relative to the outer race 196, the plurality of sprags 192 rotate about each of their respective axes of rotation 198 and lock the inner race 194 to the outer race 196, such that no relative rotation of the inner race 194 to the outer race 196 in the clockwise direction is allowed.

It should be appreciated, however, that in other embodiments, any other suitable one-way clutch 190 may be utilized, and further, the one-way clutch 190 may be positioned at any other suitable location.

Figure 6:
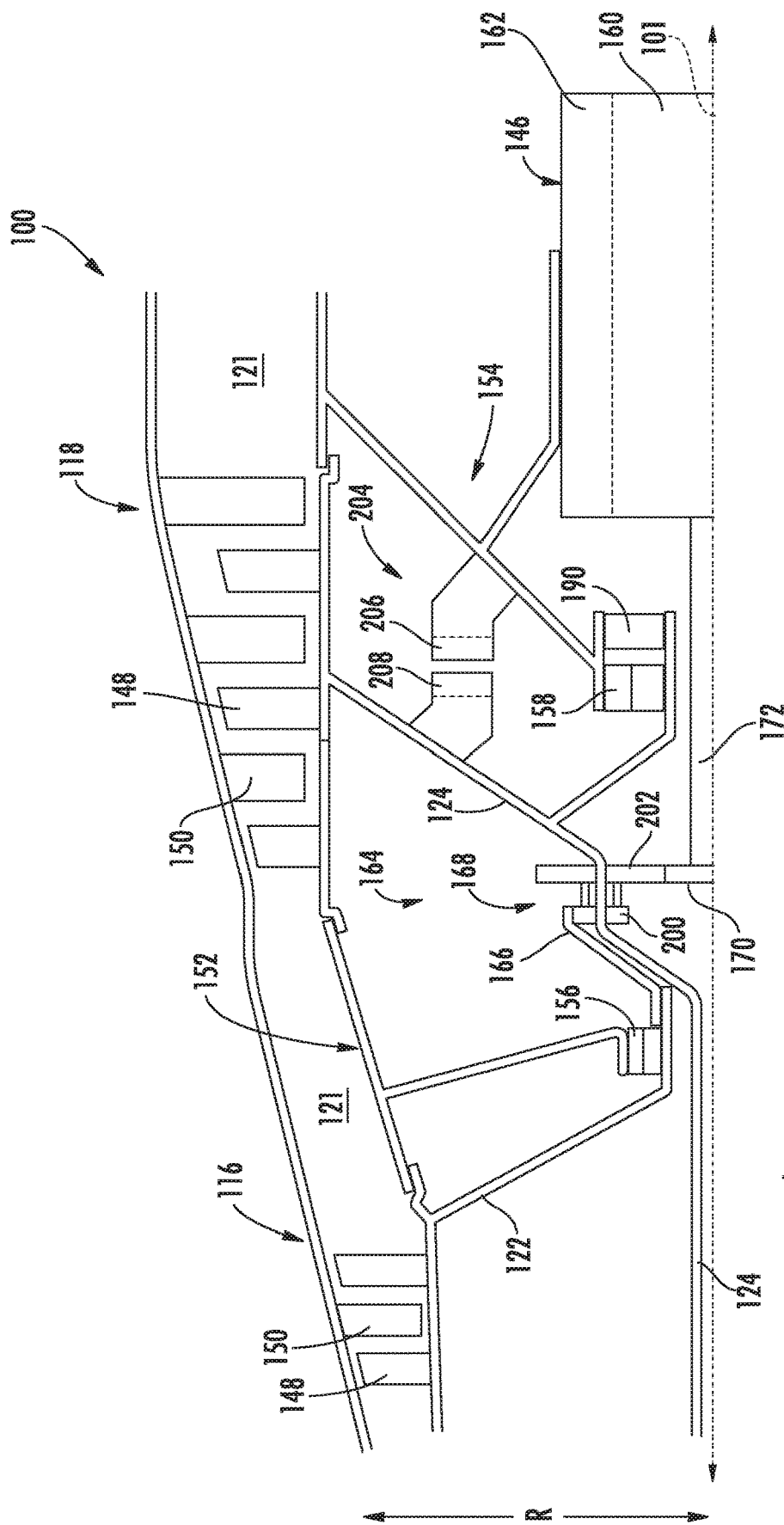
FIG. 6 is a schematic, cross-sectional view of a turbine section of a gas turbine engine in accordance with another exemplary embodiment of the present disclosure.

Furthermore, referring now to FIG. 6, a gas turbine engine including a coaxially mounted electric machine 146 configured in accordance with another exemplary embodiment of the present disclosure is provided. The exemplary gas turbine engine and electric machine 146 depicted in FIG. 6 may be configured in substantially the same manner as exemplary gas turbine engine and electric machine 146 described above with reference to FIG. 2. Accordingly, the same or similar numbers may refer to the same or similar part.

For example, the exemplary gas turbine engine depicted in FIG. 6 generally includes a turbine section including an HP turbine 116 and an LP turbine 118. Further, an HP spool 122 is attached to and rotatable with the HP turbine 116 (and an HP compressor, not shown), and an LP spool 124 is attached to and rotatable with the LP turbine 118 (and an LP compressor, also not shown). The HP spool 122 is supported at least partially by a turbine center frame 152 through a first bearing 156, and the LP spool 124 is supported at least partially by a turbine rear frame 154 through a second bearing 158.

Additionally, an electric machine 146 is positioned at least partially within or aft of the turbine section, radially inward of a core air flowpath 121 defined at least in part by the turbine section. Further, for the embodiment depicted, a gear assembly 164 is provided mechanically coupling the HP spool 122 and the LP spool 124 to the electric machine 146 for driving the electric machine 146. As with the embodiment of FIG. 2, the exemplary gear assembly 164 is configured as an epicyclic gear assembly, and more specifically as a planetary gear assembly. The exemplary gear assembly 164 includes a ring gear 166 attached to the HP spool 122, one or more planet gears 168 rotatably attached to the LP spool 124, and a sun gear 170 attached to the electric machine 146. However, for the embodiment depicted, the one or more planet gears 168 are each configured as compound planet gears having a gear ratio greater than one or less than one. More specifically, as is depicted schematically, each of the planet gears 168 includes a forward gear 200 and an aft gear 202 rigidly connected to one another. For each planet gear 168, the forward gear 200 defines a radius different than a radius of the aft gear 202, such that the respective compound planet gear 168 defines a gear ratio that is not equal to one. For the embodiment depicted, the forward gear 200 defines a radius smaller than a radius of the aft gear 202, however in other embodiments, the forward gear 200 may instead define a radius that is greater than a radius of the aft gear 202. Further, in still other embodiments, the compound planet gears may define a gear ratio equal to one (1).

Moreover, for the embodiment of FIG. 6, the gas turbine engine further includes a secondary electric machine 204. The secondary electric machine 204 includes a stator 206 and a rotor 208, with the stator 206 attached to a turbine frame and the rotor 208 attached to/rotatable with the LP spool 124. More specifically, for the embodiment depicted, the stator 206 of the secondary electric machine 204 is attached to the turbine rear frame 154. It should be appreciated, however, that although for the embodiment depicted, the secondary electric machine 204 is configured such that an air gap between the rotor 208 and stator 206 extends along the radial direction R, in other embodiments, the secondary electric machine 204 may instead be configured in any other suitable manner, for example to include an air gap extending along the axial direction A (similar to the electric machine 146).

Inclusion of the secondary electric machine 204 may allow for siphoning power out of the LP system of the gas turbine engine during certain operations of the gas turbine engine. For example, during idle conditions, wherein the gas turbine engine is designed to operate with a minimum HP spool speed, it may be desirable to reduce a speed of the LP system such that a fan of the gas turbine engine also rotates at a lower speed (see FIG. 1). Reducing a speed of the fan may reduce a minimum amount of thrust generated during idle, e.g., when an aircraft including the gas turbine engine may not want or need forward thrust.

In addition, the secondary electric machine 204 may be utilized to further reduce the turndown ratio of the primary electric machine 146. For example, the secondary electric machine 204 may be utilized to power the LP spool 124 to adjust a speed ratio between the LP spool 124 and HP spool 122. Accordingly, the secondary electric machine 204 may be utilized to reduce the turndown ratio to approximately 1:1, which may allow for the primary electric machine 146 to be designed at a minimum size.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and an axial direction, the gas turbine engine comprising:
a compressor section comprising a first compressor and a second compressor;
a turbine section comprising a first turbine and a second turbine, the compressor section and the turbine section together defining at least in part a core air flowpath;
a first spool rotatable with the first turbine and the first compressor;
a second spool rotatable with the second turbine and the second compressor;
an electric machine comprising a rotor, the rotor being positioned at least partially inward of the second turbine along the radial direction, wherein the rotor and the second turbine at least partially overlap in the axial direction; and
a gear assembly mechanically coupling the first spool and second spool to the electric machine for driving the electric machine.

2. The gas turbine engine of claim 1, wherein the gear assembly is an epicyclic gear assembly.

3. The gas turbine engine of claim 2, wherein the epicyclic gear assembly is a planetary gear assembly comprising a ring gear attached to the first spool, one or more planet gears attached to the second spool, and a sun gear attached to the electric machine.

4. The gas turbine engine of claim 3, wherein the one or more planet gears are configured as compound gears.

5. The gas turbine engine of claim 3,
wherein the rotor is attached to a rotor shaft, and
wherein the rotor shaft is attached to the sun gear.

6. The gas turbine engine of claim 1, further comprising:
a turbine frame, wherein the second spool is supported at least partially by the turbine frame through a bearing.

7. The gas turbine engine of claim 6,
wherein the second spool is configured for rotating in a first direction when operating, and
wherein the gas turbine engine further comprises:
a one-way clutch positioned between and contacting the second spool and the turbine frame such that the turbine frame, through the one-way clutch, prevents the second spool from rotating in a direction opposite the first direction.

8. The gas turbine engine of claim 7, wherein the one-way clutch is a sprag clutch.

9. The gas turbine engine of claim 1, wherein an effective turn-down ratio for the electric machine is less than 1.4:1.

10. The gas turbine engine of claim 1,
wherein the first spool is a high pressure spool, and
wherein the second spool is a low pressure spool.

11. The gas turbine engine of claim 1, wherein the electric machine is mounted at least partially aft of the turbine section along the axial direction.

12. The gas turbine engine of claim 1, wherein the electric machine is an electric generator.

13. The gas turbine engine of claim 1, wherein the electric machine is mounted coaxially with the first spool and coaxially with the second spool.

14. The gas turbine engine of claim 1, further comprising:
a turbine frame; and
a secondary electric machine comprising a second rotor rotatable with the second spool and a stator attached to the turbine frame.

15. A gas turbine engine defining a radial direction and an axial direction, the gas turbine engine comprising:
a turbine section comprising a first turbine and a second turbine, the turbine section defining at least in part a core air flowpath;
a first spool rotatable with the first turbine;
a second spool rotatable with the second turbine;
an electric machine comprising a rotor, the rotor being positioned at least partially inward of the second turbine along the radial direction, wherein the rotor and the second turbine at least partially overlap in the axial direction; and
an epicyclic gear assembly coupled to the first spool, the second spool, and the electric machine such that both the first spool and second spool are configured for driving the electric machine.

16. The gas turbine engine of claim 15, wherein the epicyclic gear assembly is a planetary gear assembly comprising a ring gear attached to the first spool, one or more planet gears attached to the second spool, and a sun gear attached to the electric machine.

17. The gas turbine engine of claim 16, wherein the one or more planet gears are configured as compound gears.

18. The gas turbine engine of claim 16,
wherein the rotor is attached to a rotor shaft, and
wherein the rotor shaft is attached to the sun gear.

19. The gas turbine engine of claim 15,
wherein the second spool is configured for rotating in a first direction when operating, and
wherein the gas turbine engine further comprises:
a turbine frame; and
a one-way clutch positioned between and contacting the second spool and the turbine frame such that the turbine frame, through the one-way clutch, prevents the second spool from rotating in a direction opposite the first direction.

20. The gas turbine engine of claim 15, wherein an effective turn-down ratio for the electric machine is less than 1.4:1.

\* \* \* \* \*